No. 623,465. Patented Apr. 18, 1899.
G. S. DUNCAN.
APPARATUS FOR SEPARATING GOLD AND SILVER BEARING SOLUTIONS FROM ORES OR SLIMES.
(Application filed Sept. 28, 1898.)
(No Model.)
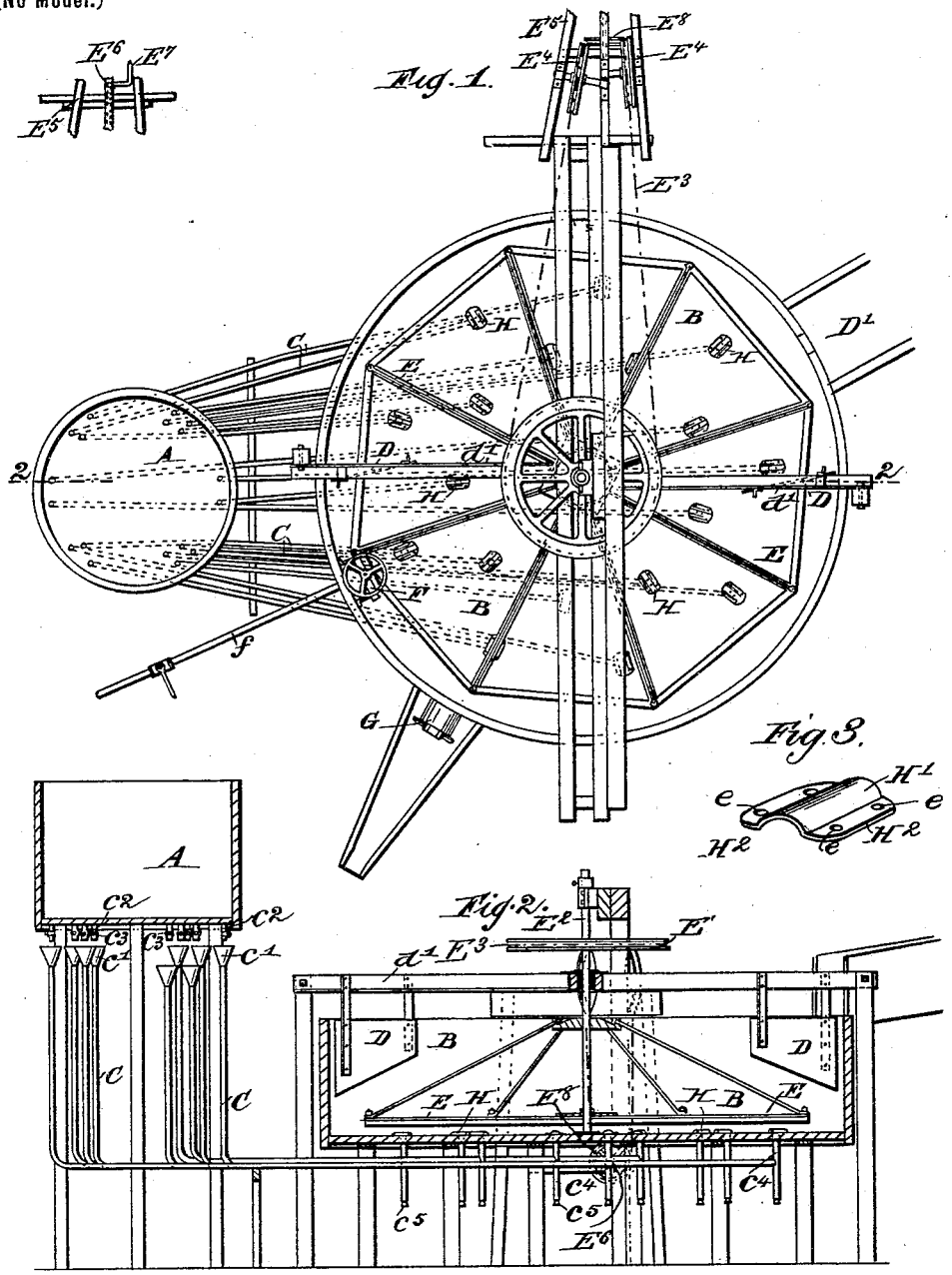
Witnesses
F. B. Keifer
Bruce S. Elliott
Inventor
George S. Duncan
By James L. Norris
Atty
THE NORRIS PETERS CO., PHOTO-LITHO., WASHINGTON, D. C.

UNITED STATES PATENT OFFICE.

GEORGE SMITH DUNCAN, OF TARNAGULLA, VICTORIA.

APPARATUS FOR SEPARATING GOLD AND SILVER BEARING SOLUTIONS FROM ORES OR SLIMES.

SPECIFICATION forming part of Letters Patent No. 623,465, dated April 18, 1899.

Application filed September 28, 1898. Serial No. 692,089. (No model.)

*To all whom it may concern:*

Be it known that I, GEORGE SMITH DUNCAN, engineer, a subject of the Queen of Great Britain, residing at Tarnagulla, in the British Colony of Victoria, have invented a new and useful Improved Apparatus for the Separation of Gold and Silver Bearing Solutions from Residual Ores or Slimes, (for which I have applied for Letters Patent in the British Colonies of Victoria, No. 15,292, dated June 21, 1898; New South Wales, No. 8,451, dated June 22, 1898; Queensland, No. 4,462, dated June 24, 1898; South Australia, No. 5,444, dated June 22, 1898; Tasmania, No. 2,192, dated June 23, 1898; New Zealand, No. 10,741, dated June 30, 1898, and Western Australia, No. 2,116, dated June 29, 1898,) of which the following is a specification.

This invention relates to the separation of gold and silver bearing solutions from finely-divided residual ores or slimes.

Hitherto upward percolation has been used for the displacement of the various gold and silver bearing solutions in the treatment under the cyanid or other similar processes of tailings or free-leaching ores which are not in the form of slimes. With this upward percolation false bottoms for the vats with webbing upon them have been used and the solutions have been introduced underneath these false bottoms, which have acted as distributers therefor and allowed them to pass evenly up through the free-leaching ore, displacing the gold and silver bearing solution contained therein. This false bottom and webbing are adapted for use with free-leaching ores only and cannot be employed for displacing solutions used in treating very finely-crushed ores or slimes which do not leach freely.

The present invention has been devised in order that the various solutions may be, as above described, from finely-displaced crushed ore or slimes, to which I have just alluded, without the aid of any false bottom and filtering-webbing.

In order that this invention may be clearly understood, I will describe it by reference to the accompanying drawings, in which—

Figure 1 is a plan of my improved apparatus, while Fig. 2 is a vertical central section on line 2 2, Fig. 1. Fig. 3 is a detail view showing upon an enlarged scale one of the hoods arranged on the bottom of the vat B over the exit end of one of the pipes that discharge the solutions into said vat, the bottom of the latter being omitted in this figure in order to show the parts more clearly.

The same reference-letters indicate the same parts in all of the figures.

Hitherto in the treatment of slimes the great difficulty experienced has been in separating the solutions from the residual slimes. Now according to my invention it is effected in a ready way by means of upward displacement without the aid of any false bottom or filtering-webbing.

According to my invention I provide a solution-vat A, a leaching or displacement vat B, and a series of pipes C, constructed and arranged as hereinafter described, whereby the two vats are connected together. The vat B can be used either as a leaching or a displacement vat separately or as a combined leaching and displacement vat. It is fitted with deflecting-plates D, stirrers E, overflow-valve F, slime-box D', and discharge-valve G. The deflecting-plates D do not project inward from the side of the vat, but are suspended from suitable cross-bars or other supports $d'$ in such a position as to leave a space between them and the side of the vat. This allows a better circulation of the material under treatment, which is hereinafter referred to as "pulp," and in practice insures a more thorough extraction of the precious metals than is practicable with plates projecting from the side of the vat, as in practice it has been found that the material banks up against plates arranged in this way. The stirrers E are of ordinary construction and may be driven in any suitable manner, as will be readily understood. In the present instance I have shown as one of the different forms of mechanism that may be employed for this purpose a grooved pulley E', mounted horizontally on a shaft $E^2$, from which the stirrers E radiate. Said pulley is operated by a rope, chain, or belt $E^3$, which is carried over guide-pulleys $E^4$, mounted on a suitable supporting-framework $E^5$, in which is also supported a driving-shaft $E^6$. (Shown in dotted lines in Fig. 1.) This shaft is actuated by any means adapted for the purpose, and for the purposes of this application I have shown an ordinary crank $E^7$ upon the end of the driving-shaft. The rope, belt, or chain $E^3$ passes around a pulley $E^8$ on the shaft $E^6$ and is then carried upward over the guide-pulleys $E^4$ and thence around the grooved pulley $E'$. The overflow-valve F and discharge-valve G are likewise of ordinary construction.

The pipes C, connecting the vats A and B, are formed at their upper ends with funnel-shaped mouths $c'$, each of which is fed by a short length of pipe $c^2$, fitted with stop cocks or valves $c^3$, whereby the rate of discharge from the solution-vat A can be regulated.

The lower ends of the pipes C are connected with the vat B by a T connection $c^4$, in the bottom of which is a plug $c^5$, which can be opened when desired in order to allow some of the solution to flow from said pipes, which will thereby be cleared.

The solution-vat A is carried upon some suitable support at a higher elevation than the leaching or displacement vat B. The lower ends of the pipes C lead to a number of openings, which are evenly distributed over the bottom of the vat B in order that the solution fed into it may be diffused as much as possible. To still further assist in obtaining this result, as well as to prevent the pipes C being choked with pulp, I provide hoods H over the openings, as shown. These hoods are arranged radially—that is, across the current set up by the stirrers—and in addition to allowing of a free circulation of the solution entering the vat and preventing the pipes C from being choked up they prevent the solution rising directly into the slimes in vertical columns. By means of the pipes C, coupled with the hoods H, the solutions from the vat A can be delivered evenly over the bottom of the vat B.

The hoods H consist substantially of thin sheets of any suitable material slightly arched between two edges, as shown at $H'$ in Fig. 3, and having the edges or margins $H^2$, which lie on opposite sides of said arch, provided with holes $e$, through which nails or screws or other suitable fastenings may be passed to secure the hood in place. I have shown these hoods in Fig. 1 applied to the bottom of the vat B over the discharge ends of the pipes $C^4$, the arched portions $H'$ being arranged substantially in radial lines of the vat or at right angles to the currents created by the stirrers E, as already explained.

The use of the funnel-shaped mouths $c'$ on the upper ends of the pipes C allows the solutions fed into said pipes to be maintained at a fixed level above the top of the solution in the vat B. If it were not for the broken connection between the two vats, the solution would be fed into the displacement-vat at constantly-varying pressures.

The treatment of auriferous and argentiferous material according to this invention is as follows: The chemical solutions which are intended to be used as a solvent of the precious metals in the material to be treated are supplied to the leaching-vat B either direct or through the medium of the solution-vat A and pipes C until the whole of the solution required for the treatment is stored in the leaching-vat B. The stirrers E are set in motion in order to cause the solution to revolve and the charge of ore or slime to be treated is gradually fed into this vat, the stirring being continued until the extraction is completed, when it is stopped and the pulp is allowed to settle until there is, say, an inch or more of clear solution above the surface of the pulp. A weak solution, equal in quantity to about one-half that of the strong solution, is then supplied to the vat A and allowed to pass slowly down the pipes C and through the bottom of the vat B, the effect of which is to displace the gold and silver bearing solution by forcing it upward through the pulp and causing it to pass over the valve F and along the draw-off pipe $f$ into the strong-solution storage-vat. When the whole of the weak solution has been fed from the vat A into the vat B, a washing or weaker solution is supplied to the former and is fed slowly into said vat B through the pipes C. This washing solution is also about one-half the quantity of the strong solution, and as it rises in the vat B it completes the displacement and removal of the strong solution from the pulp. The weak and washing solutions now remain in the pulp. These are displaced by pumping water into the vat A and feeding it slowly into the vat B through the pipes C, the effect being to displace, first, the weak solution and, secondly, the washing solution from the vat, said solutions being drawn off through the pipe $f$ into their respective storage-vats. If the displacement has been properly carried out, the pulp in the vat B will now consist of water and ore or slime refuse; but if any solution carrying precious metals should remain in the pulp it is discharged into a dam, where it is allowed to settle, and the clear solution having been passed through precipitating-filters may be used instead of water for the displacement of the weak and washing solutions. During the displacement of the strong, the weak, and the washing solutions from the vat B the stirrers should be revolved very slowly at intervals, so as to prevent the slimes settling and facilitate displacement. With heavy slimes occasional stirring will be required during the displacement of the strong solution and more frequent stirring during the displacement of the weak and washing solutions.

With light bulky slimes more frequent stirring will be required, and with some slimes the stirrers will have to be kept in motion continuously at a very slow speed during the displacement of the whole of the strong, the weak, and the washing solutions.

Having now particularly described and ascertained the nature of my said invention and in what manner the same is to be performed, I declare that what I claim is—

1. The apparatus hereinbefore described for the separation of solutions of the precious metals from residual ores and slimes, said apparatus consisting of a leaching and displacement tank, or vat, stirring devices arranged within the same, a tank or vat for the solutions, a series of pipes arranged to receive said solutions from the latter vat and carry the same to and through the bottom of the leaching and displacement tank, hoods arranged over the discharge ends of said pipes, and means for controlling the rate of velocity of the fluid entering the bottom of the leaching and displacement vat, substantially as described.

2. In an apparatus for separating solutions of the precious metals from residual ores and slimes, the combination with a vat for said solutions of a leaching and displacement vat, at a lower level, a series of pipes having funnel-shaped ends lying beneath the solutions-vat, their other ends entering pipes which open through the bottom of the leaching and displacement vat, hoods arranged over the discharge ends of the latter pipes, a series of short, valved pipes hanging from the bottom of the solutions-vat and arranged to discharge into the funnel-shaped ends of the pipes which carry the solutions to the leaching and displacement vat, and stirring mechanism arranged to rotate in the latter, substantially as described.

3. In an apparatus for the separation of solutions of the precious metals from residual ores and slimes, the combination with a solutions-vat and a leaching and displacement vat placed at a lower level, of a series of pipes having funnel-shaped ends arranged beneath the solutions-vat, a series of short pipes having valves to discharge from the bottom of the latter vat into said funnel-shaped pipe ends, the exit ends of the pipes receiving the solutions having communication with T connections consisting of pipes opening through the bottom of the leaching and displacement vat, their lower ends having removable plugs, a series of stirrers extending radially from a central shaft in said vat, and a series of hoods which are slightly arched, the arched portions being placed over the open ends of the pipes entering the bottom of the leaching-vat, and arranged at right angles to the movement of currents produced by the stirrers, substantially as described.

4. In an apparatus for separating solutions containing the precious metals from residual ores and slimes, the combination with a vat for said solutions of a leaching and displacement vat, pipes to convey the solutions from the former to the latter and introduce the same through the bottom of the leaching-vat, and hoods consisting of sheets of suitable material each having a slightly-arched portion which is placed over the open or discharge end of one of said pipes, the longitudinal line of the arch being arranged in the radial line of the leaching-vat, substantially as described.

5. In an apparatus for separating solutions of the precious metals from residual ores and slimes, the combination with a leaching and displacement tank or vat and with a vat to hold said solutions, the latter being placed at a higher level than the former, of a series of pipes to convey said solutions from the higher vat, the discharge ends of said pipes entering the leaching-vat, a series of hoods having slightly-arched portions which overlie the said discharge ends, and stirring-arms radiating from a central shaft in said vat, the arched portions of the hoods being arranged in radial lines, or at right angles to the movement of currents set up by the stirring-arms, substantially as described.

GEORGE SMITH DUNCAN.

Witnesses:
 EDWARD WATERS, Jr.,
 WALTER SMYTHE BAYSTON.